W. GOETZ.
RELEASABLE HOOK.
APPLICATION FILED SEPT. 22, 1920.
1,428,775.                                              Patented Sept. 12, 1922.
Fig. 1.
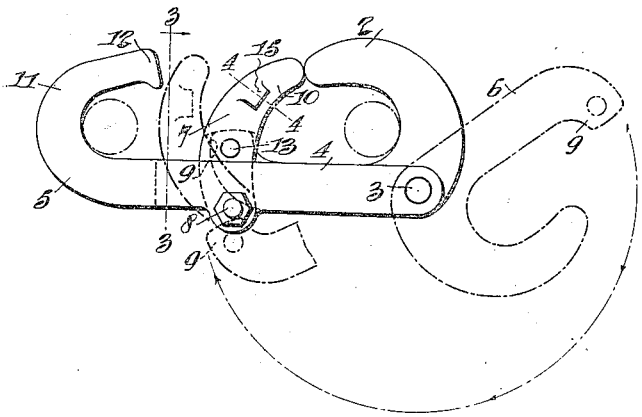
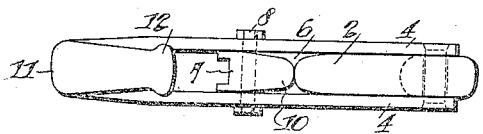
Fig. 2.
Fig. 4.
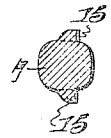
Fig. 3.
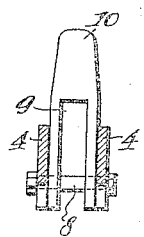
Inventor
William Goetz.
By Fred G. Dieterich
Attorneys Patented Sept. 12, 1922.

1,428,775

UNITED STATES PATENT OFFICE.

WILLIAM GOETZ, OF VANCOUVER, BRITISH COLUMBIA, CANADA.

RELEASABLE HOOK.

Application filed September 22, 1920. Serial No. 412,078.

*To all whom it may concern:*

Be it known that I, WILLIAM GOETZ, citizen of the Dominion of Canada, residing at Vancouver, in the Province of British Columbia, Canada, have invented certain new and useful Improvements in Releasable Hooks, of which the following is a specification.

This invention relates to a means for releasably connecting a wire guy rope to its anchorage.

Though particularly designed with this object, it may be applicable to many other uses in connection with wire rope transmission, where immediate release of a tight line is required, the object of the invention being to provide a releasable hook which is positively held in the securing position and with the opening to the hook closed when in use.

The invention is particularly described in the following specification, reference being made to the drawings by which it is accompanied, in which:

Fig. 1 is a side elevation of the hook, the full lines indicating the hook in the secured position, and the dot and dash lines in the position of release.

Fig. 2 is a plan of the hook as shown in Fig. 1.

Fig. 3 is a cross section on the line 3—3 in Fig. 1 looking in the direction of the arrow, and Fig. 4 is a cross section on the line 4—4 in Fig. 1.

In these drawings 2 represents a hook which is pivotally mounted at 3 between the open sides 4 of a member 5 by which the hook is connected to its anchorage in a manner to be described later.

The shank 6 of the hook 2 is free to move between the sides 4 of the connecting member in the direction of the arrow, and when in the retaining position lies between them with the outwardly turned end 9 reduced in thickness to pass between the sides of a locking member 7, which is pivotally mounted at 8 between the side members 4.

This locking member 7 is extended and curved forward as at 10 to close the opening to the hook 2 when it is in the retaining position, but is susceptible of being moved on its pivot pin 8 to effect release of the hook, as indicated by the dot and dash lines in Fig. 1, when the shank 6 of the hook is free to turn backward in the direction of the arrow to the release position indicated by the dot and dash lines in Fig. 1.

A projection 15 is provided on each side of the locking member 7, on which a blow may be delivered to release the hook without the operator exposing himself to the risk of being injured by the released hook.

The locking member 7 is secured in the locked position by a pin 13 which passes through apertures in the sides of 7 and through a registering aperture in the outwardly turned end 9 of the hook shank.

When a blow is struck on the projection 15 to drive the member 7 from the full line to the dot and dash line position in Figure 1 the pin 13 is sheared off and the hook is released.

The member 5 in which the hook 2, 6 is mounted has suitable provision for connection of it to the anchorage. In the drawing it is shown as bent to form a hook 11 to receive a sling or shackle connected to the anchorage, and the tip of this hook is enlarged or mushroomed as at 12 to prevent accidental release from the connection.

It will be noted that the shank 6 of the hook 2 is checked in the retaining position between the sides 4 by contact of the back of the shank with the pin 8 on which the locking member 7 is mounted, and that the shank end 9 is also checked against the pin 8 when the hook 2 swings round on being released from a tight line.

Attention is also drawn to the fact that the locking member 7 is stopped at the locked position with the apertures registering for the reception of the pin 13 by contact of its produced end 10 with the point of the hook 2.

It will be noted that the hook 2 is positively held by the locking member 7 against inversion to effect release. The pin 13 only prevents movement of that locking member to effect release.

The device is a simple and efficient one for the purpose for which it is designed, as the tension or pull applied to the hook 2 tends to invert it, when freed from the retaining means, the bend of the hook being out of line of the pivot 3 on which it turns: Yet when in use the hook is positively held against inversion by the retaining member 7 which is pivotally mounted at practically the same radial distance from the pivot 3 as the retaining engagement of 7 on the end 9 of the shank.

The fact that the retaining member 7 serves also when in use, the purpose of closing the hook opening, is advantageous in that the hook is always closed when it can be used as such, that is, when it is secured in the holding position by the member 7.

Having now particularly described my invention, I hereby declare that what I claim as new and desire to be protected in by Letters Patent, is:

1. A releasable hook, comprising in combination a member having provision at one end for connecting it to a line or anchorage and the other end lengthwise divided into two parallel and adjacent sides, a hook pivotally mounted between the sides of the connecting member adjacent the bend of that hook to the shank, a retaining member pivotally mounted on the connecting member and adapted to be moved over that side of the end of the shank which is toward the bend of the hook, and means for securing the retaining member in the retaining position.

2. A releasable hook, comprising in combination a member having provision at one end for connecting it to a line or anchorage and toward the other end lengthwise divided into two parallel sides, a hook pivotally mounted between the sides of the connecting member adjacent the bend of the hook to the shank, the end of the shank of the hook being turned toward the point of the hook, a retaining member pivotally mounted on the sides of the connecting member and adapted to be moved over the turned end of the shank of the hook, and means for connecting the retaining member to the end of the shank.

3. A releasable hook, comprising in combination a member which at one end has provision for connecting it to an anchorage and toward the other end is divided lengthwise into two parallel sides, a hook pivotally mounted between the sides of the connecting member that the shank of the hook may normally lie between the sides, a retaining member pivotally mounted on the connecting member to turn over that side of the shank which is toward the hook, said retaining member being extended to close access to the hook when in the retaining position, and means for securing the retaining member in the retaining and closing position.

4. A releasable hook, comprising in combination, a member having at one end provision for connecting it to an anchorage and at the other end divided lengthwise, a hook pivotally mounted adjacent the bend of the hook to the shank between the lengthwise divided sides of the connecting member the end of the shank of the hook being turned toward the point of the same and reduced in thickness, a retaining member pivotally mounted in the connecting member at a radial distance from the pivot of the hook approximately the same as that of the reduced end of the shank, which retaining member is slotted to fit over that reduced end and extended therebeyond to contact with the point of the hook when in the retaining position and a pin passing through apertures in the retaining member, and an aperture in the reduced end of the shank.

In testimony whereof I affix my signature.

WILLIAM GOETZ.